US008046890B2

(12) United States Patent
Korkeakangas et al.

(10) Patent No.: US 8,046,890 B2
(45) Date of Patent: Nov. 1, 2011

(54) ROPING METHOD AND APPARATUS

(75) Inventors: Niko Korkeakangas, Turku (FI); Håkan Bärneman, Solna (SE)

(73) Assignee: Kone Corporation, Helsinki (FI)

( * ) Notice: Subject to any disclaimer, the term of this patent is extended or adjusted under 35 U.S.C. 154(b) by 313 days.

(21) Appl. No.: 12/289,032

(22) Filed: Oct. 17, 2008

(65) Prior Publication Data

US 2009/0114483 A1 May 7, 2009

Related U.S. Application Data

(63) Continuation of application No. PCT/FI2007/000100, filed on Apr. 17, 2007.

(30) Foreign Application Priority Data

Apr. 18, 2006 (FI) ..................................... 20060371

(51) Int. Cl.
*B23P 19/04* (2006.01)
*B66B 7/06* (2006.01)

(52) U.S. Cl. ..................................... 29/402.08; 187/266

(58) Field of Classification Search ............... 29/402.08, 29/402.01, 428; 187/266
See application file for complete search history.

(56) References Cited

FOREIGN PATENT DOCUMENTS

| | | | |
|---|---|---|---|
| EP | 0 110 250 | A2 | 6/1984 |
| EP | 1 591 406 | A2 | 11/2005 |
| GB | 1 364 699 | A | 8/1974 |
| JP | 3-13477 | A | 1/1991 |
| JP | 7-196240 | A | 8/1995 |
| JP | 11-199157 | A | 7/1999 |
| JP | 2003-40551 | A | 2/2003 |

*Primary Examiner* — John C Hong

(74) *Attorney, Agent, or Firm* — Birch, Stewart, Kolasch & Birch, LLP

(57) ABSTRACT

Roping method and apparatus for replacing, installing and/or re-roping the hoisting rope of a traction sheave elevator, said elevator having an elevator car, which is at least partially suspended on a set of hoisting ropes, said set of ropes comprising one or more parallel ropes. The elevator car is moved by means of the ropes. In the method, a rope feed apparatus (1) acting on the hoisting rope is used to feed a new rope to the elevator and/or to pull out a possible old hoisting rope to make place for the new rope. The rope feed apparatus 1 (1) comprises at least a base (2) with at least one feed disc (30, 31) mounted on it, which feed disc (30, 31) engages the hoisting rope and to which feed disc (30, 31) the hoisting rope can be fitted, at least one guide roller (25) for keeping the hoisting rope in position on the feed disc (30, 31), a tightening element (19) for moving the feed disc (30, 31) relative to the guide roller (25) and tightening it in position on the base (2), and in addition at least one electric motor (27) fitted in the apparatus to rotate the feed disc (30, 31).

9 Claims, 4 Drawing Sheets

ROPING METHOD AND APPARATUS

The present invention relates to a method for replacing, installing and/or re-roping a hoisting rope of a traction sheave elevator and to rope feed apparatus for re-roping a traction sheave elevator, replacing the ropes and/or installing the ropes.

In a prior-art method for replacing the ropes of a traction sheave elevator, both ends of the old rope are released from their anchorages and the old rope is removed manually. After the removal of the old rope, the new rope is threaded into position over the traction sheave and diverting pulleys possibly provided on the counterweight and fixed structures. As this is a manual method, it requires plenty of muscular power and work force. At each diverting pulley, on which where the rope direction changes, an installer must be present to take care of the passage of the rope. Traditionally, this work has been carried out by installers standing on separately constructed scaffolds or ladders, which is a risky method. In addition, the rope changing replacement operation performed by muscular power is physically very straining and susceptible to accidents and requires many breaks in the work. All this means a long overall time required for rope change. Manual handling of the old rope, which has sharp broken strands jutting outwards, tends to cause accidents. Prior-art methods are inefficient and poor in respect of safety, e.g. as regards working ergonomics. There are also prior-art mechanically implemented rope changing devices, but they involve problems relating to controllability of the rope and fittability of the apparatus in place e.g. for a rope change replacement operation. A prior-art method and apparatus for replacing the hoisting rope of an elevator are described in specification EP1591406A2, among others.

The object of the invention is to provide solutions to some of the above-mentioned problems or to achieve at least one of the following objectives. On the one hand, it is an object of the invention to disclose a method and an apparatus that will enable faster rope change, reduce the workforce required, lower the costs and improve work safety. On the other hand, it is an object of the invention to disclose a method and an apparatus that will be applicable for use in conjunction with re-roping of an elevator, rope replacement and/or installation of a new elevator rope. A further object of the invention is to disclose a method and an apparatus that will make it possible to control the rope delivery, i.e. both the rope being to be fed and the rope being to be pulled out, and an additional object of the invention is to create an apparatus that can be easily mounted on the hoisting ropes.

Inventive embodiments are also presented in the description part and drawings of this application. The inventive content disclosed in the application can also be defined in other ways than is done in the claims below. The inventive content may also consist of several separate inventions, especially if the invention is considered in the light of explicit or implicit sub-tasks or with respect to advantages or sets of advantages achieved. In this case, some of the attributes contained in the claims below may be superfluous from the point of view of separate inventive concepts. Correspondingly, details described in connection with each embodiment example of the invention used embodiment examples as well.

The advantages achievable by the invention include one or more of the following:

- The invention allows easy control of both the rope being fed, which preferably is a new rope, and the rope being pulled out, which preferably is an old rope to be replaced
- The method and apparatus of the invention for replacing elevator. ropes are applicable for use both in a situation where an old rope is to be replaced with a new one and in the installation of a new elevator and possibly in an elevator re-roping operation
- The method and apparatus of the invention are safe, ergonomic and efficient in use
- The apparatus of the invention is inexpensive to implement
- The invention makes it possible to replace the ropes without dismantling the elevator system, and advantageously no separate hoist is needed for the installation
- It is possible to replace the ropes without moving the car or counterweight
- A further advantage is that the method and apparatus are not dependent on the existing hoisting machine
- A significant advantage achieved by the method and apparatus of the invention are also the cost savings, because e.g. a rope replacement can be carried out by a single installer
- Moreover, rope replacement can be carried out in a short time, so the duration of down-time of the elevator is minimized
- The same apparatus is applicable for use with all rope diameters, and the apparatus can engage the hoisting rope without the rope having to be separately threaded through the apparatus
- Using the apparatus of the invention, rope can be pulled out and fed in simultaneously and in a controlled manner
- The invention makes it possible to implement a rope splice that is safe and dependable in use and the rope splice can be passed through the apparatus
- The rope pulling device included in the apparatus of the invention can be used for all roped elevators
- The invention is also applicable for use in roped elevator solutions without counterweight
- Can be used in conjunction with both elevators without machine room and elevators with machine room, as well as in conjunction with elevator solutions with machine above or below and elevator solutions with machine laterally mounted above or laterally mounted below
- In addition, by using the solution of the invention, it is possible to install or replace the hoisting ropes of even elevators suspended with large suspension ratios, in which elevators the suspension ratio may be e.g. 4:1, 5:1, 6:1 or even 10:1 or even larger.
- A simple and economical method and apparatus for feeding the rope and collecting the old rope on a neat coil in conjunction with the replacement of the hoisting ropes are achieved, while at the same time the ergonomics, safety and cleanness of the rope changing work are improved and the work costs are reduced.
- The rope feed apparatus can be so positioned that it will advance into position by utilizing the rope in the elevator shaft.

The primary area of application of the invention is elevators intended for passenger and/or goods transport.

The method disclosed by the invention is a roping method for replacing or installing and/or re-roping the hoisting rope of a traction sheave elevator, said elevator having an elevator car at least partially suspended on a set of hoisting ropes comprising one or more parallel ropes by means of which the elevator car is moved. According to the method of the invention, a rope feed apparatus acting on the hoisting rope is used to feed a new rope to the elevator and/or to pull out a possible old hoisting rope to make place for the new rope.

In a method according to the invention, the rope feed apparatus is mounted in place by driving it into position in the elevator shaft by utilizing the rope existing in the elevator shaft.

In a method according to the invention, the rope is arranged to be collected in a collecting container, and the rope to be collected is pushed into the collecting container by causing the collecting container to be rotated about an axis of rotation by the thrust force of the rope.

A method according to the invention for replacing the hoisting ropes of an elevator and/or re-roping an elevator comprises the steps of a) securing the elevator car and its possible counterweight in position,
b) slackening the hoisting ropes, preferably by raising the elevator car by a required distance
c) fitting the rope feed apparatus to act on the hoisting rope
d) releasing both ends of the hoisting rope from their anchorages
e) joining the new rope to be fed in with one end of the old rope to be pulled out of the elevator shaft by a rope splice
f) feeding the new rope to the elevator and pulling out the old hoisting rope by means of the rope feed device,
g) securing the new hoisting rope at either end to the final anchorages,
h) repeating steps b)-g) for each rope in the set of hoisting ropes,
i) removing the rope feed apparatus and releasing the elevator car and its possible counterweight from the secured state so as to let them be supported by the new hoisting rope.

A method according to the invention for installing elevator ropes on an elevator comprises the steps of a) securing the elevator car and its possible counterweight in their installation positions,
b) securing the rope feed device in position in the elevator shaft, in the machine room or in some other appropriate place,
c) fitting an elevator hoisting rope to run through the rope feed device,
d) feeding the rope to a possible counterweight by means of the rope feed device and fastening the rope to it at its final point of anchorage,
e) securing the other end of the rope to its final point of anchorage,
f) releasing the rope feed device and repeating steps b)-e) depending on the number of hoisting ropes
g) removing the rope feed apparatus and tensioning the hoisting ropes to their final tightness.

The invention also relates to a rope feed apparatus for installing, replacing and/or re-roping an elevator hoisting rope, said elevator having an elevator car at least partially suspended on a set of hoisting ropes comprising one or more parallel ropes by means of which the elevator car is moved. According to the invention, the rope feed apparatus comprises at least a base with at least one feed disc mounted on it, said feed disc engaging the hoisting rope and to which feed disc the hoisting rope can be fitted, at least one guide roller for keeping the hoisting rope in position on the feed disc, a tightening element for moving the feed disc relative to the guide roller and tightening it in position on the base, and in addition at least one electric motor fitted in the apparatus to rotate the feed disc.

According to an embodiment of the invention, the feed disc of the rope feed apparatus comprises at least two discs, between which the hoisting ropes can be pressed. At least one of the discs is movable relative to the guide roller to allow the hoisting rope to be engaged in the apparatus and tightenable in position by a tightening element, which preferably is a tightenable spring.

According to an embodiment of the invention, the apparatus comprises two or more feed discs (30, 31), and the apparatus comprises two or more guide rollers (25).

According to an embodiment of the invention, the tightenable spring or equivalent of the rope feed apparatus is disposed outside the feed disc formed by the discs to press the discs placed in mutual alignment against each other.

According to an embodiment of the invention, the tightenable spring or equivalent of the rope feed apparatus is in coaxial alignment with the axis of revolution of the feed disc.

As for the other embodiments of the method and apparatus of the invention, reference is made to the attached claims.

In the following, the invention will be described in detail by referring to a few embodiment examples and the attached drawings, wherein FIG. 1 is a diagrammatic representation of a situation according to the invention where an old hoisting rope is being replaced with a new one.

Figure 1:
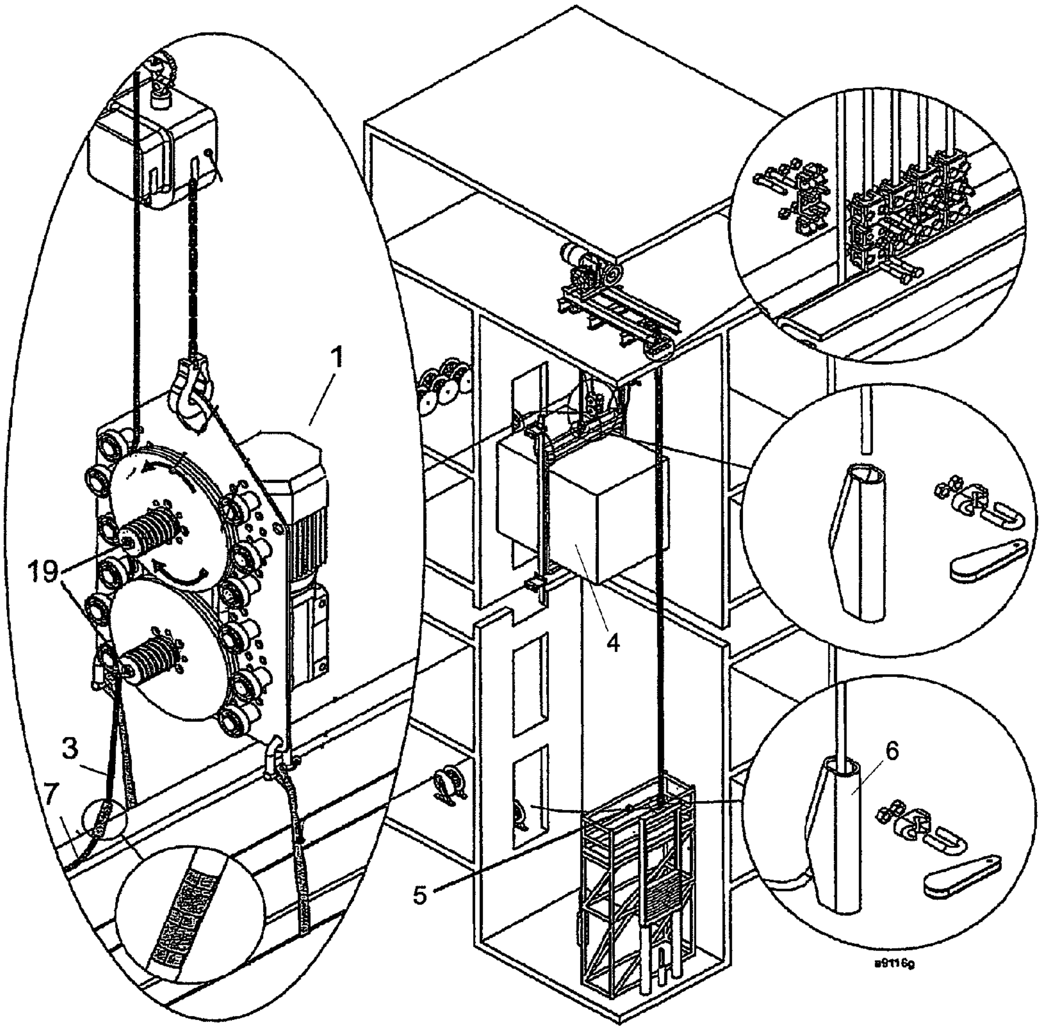

FIG. 1 represents a situation according to the invention where an old elevator hoisting rope 3 is being replaced with a new hoisting rope 7. The elevator in question is an elevator with machine above and provided with a counterweight and a machine room. The new hoisting ropes 7 are placed on the topmost landing, from where they are passed to the elevator car 4 and to a rope feed device 1 acting on the hoisting ropes at a point near the car.

Another way of implementing the roping of a 1:1 suspended elevator is a situation where the elevator car 4 and counterweight 5 are initially secured in place in the elevator shaft oppositely to each other. After that, the elevator car 4 is raised by utilizing one or two supporting ropes, leaving the other hoisting ropes slack. This is implemented by utilizing a supporting rope to raise the car, because the elevator safety coefficients in elevator operation are so high that even a single rope will support the car and counterweight with a reasonable reliability. If necessary, two hoisting ropes may be used. Thus, no scaffolding is needed when ropes are being fastened to the counterweight. In the method, it is possible to use either rope clamps, a rope frog or a suitable rope clip. Next, the ropes are replaced one at a time, starting from the ropes left slack. Once the other ropes have been changed, the elevator car is lowered so that it becomes supported by the new ropes, whereupon the ropes previously used to support the car are replaced and finally the rope tensions are equalized.

For a 2:1 suspended elevator with machine room above, rope replacement is so implemented that the method comprises the steps of setting the counterweight on a support
raising the car to a desired height by means of a chain hoist, leaving the ropes slack
fastening the rope feed device to the ropes so that it will be possible to both feed and pull a rope into the shaft
operating the machine so as to slacken the rope ends
releasing the rope from the anchorages
splicing the new and old ropes together
pulling the new rope into position and coiling the old rope onto a rope reel
removing the splice
securing the new rope in place
removing the machine to the next rope and repeating the required steps for the rope.

For a new 1:1 suspended elevator, the roping is so implemented that the method comprises the steps of lowering the ropes by means of a rope feed device until they reach the counterweight securing the rope to the car releasing the rope feed device and lowering the next rope once the ropes have been lowered into the shaft, the roping is finished by securing the ropes to the counterweight, e.g. by lifting the car up with a mounting jack. The same can be accomplished without moving the car if the counterweight is resting on sufficiently high mounting beams, so-called logs.

The rope is fed in a controlled manner into the shaft by utilizing a rope feed device. The rope feed device can be placed on the overhead beam of the car, on the machine room floor or mounted hanging in the shaft. The roping of a new 1:1 elevator is preferably carried out with the car top leveled with the topmost landing while the counterweight is resting on the buffers in a manner corresponding to the configuration according to the example in FIG. 1.

The roping of a new 2:1 suspended elevator is carried out as follows. The rope is lowered as a loop, but the end to be attached to the counterweight is fastened beforehand to a rope rod. When the loop reaches the counterweight, it is passed round a diverting pulley and the rope is pulled tight by means of a rope feed device, whereupon the rope portion to be connected to the car is fastened to the rope rod. The change is carried out by pulling the rope by means of the rope feed device. The rope reels may be placed on the landing, in the car or on the top of the car. The new and old ropes are joined together by a splice. The rope change can also be carried out with the car positioned at a high level and the counterweight supported by logs. The rope splice 6 is formed by a metal sleeve pressed onto the rope. The splice is provided with bevels and a shoulder left inside the sleeve to allow easier mounting of the rope. The splice element is provided with holes through which it is possible to see when the rope is in position ready for pressing. Striation provided on the sleeve indicates the area where the sleeve is to be pressed.

In an embodiment of the method of the invention, the rope feed apparatus 1 having a base 2 and powered by an electric motor 27 is placed in position by advancing the apparatus 1 to its position in the elevator shaft by utilizing a rope in the elevator shaft. In other words, the device can be set to climb along a stationary rope available in the elevator shaft. The rope may be one already existing in the elevator shaft, but it is also possible to mount for this purpose an auxiliary rope in the elevator shaft. The method may thus comprise a step whereby an auxiliary rope is mounted in the elevator shaft. The removal of the rope feed device in the elevator shaft to a location where the rope feed device is to be used for rope replacement or installation work is preferably performed in conjunction with other operations described in this application. This accelerates the work. The method is preferably implemented using an apparatus 1 as described elsewhere in the specification. Using a device thus defined, carrying out the method is a fast operation. The feed disc used in the method preferably comprises discs 28,29 between which the rope is passed and which are pressed together by spring force applied to the area of the centers of revolution.

Figure 2:
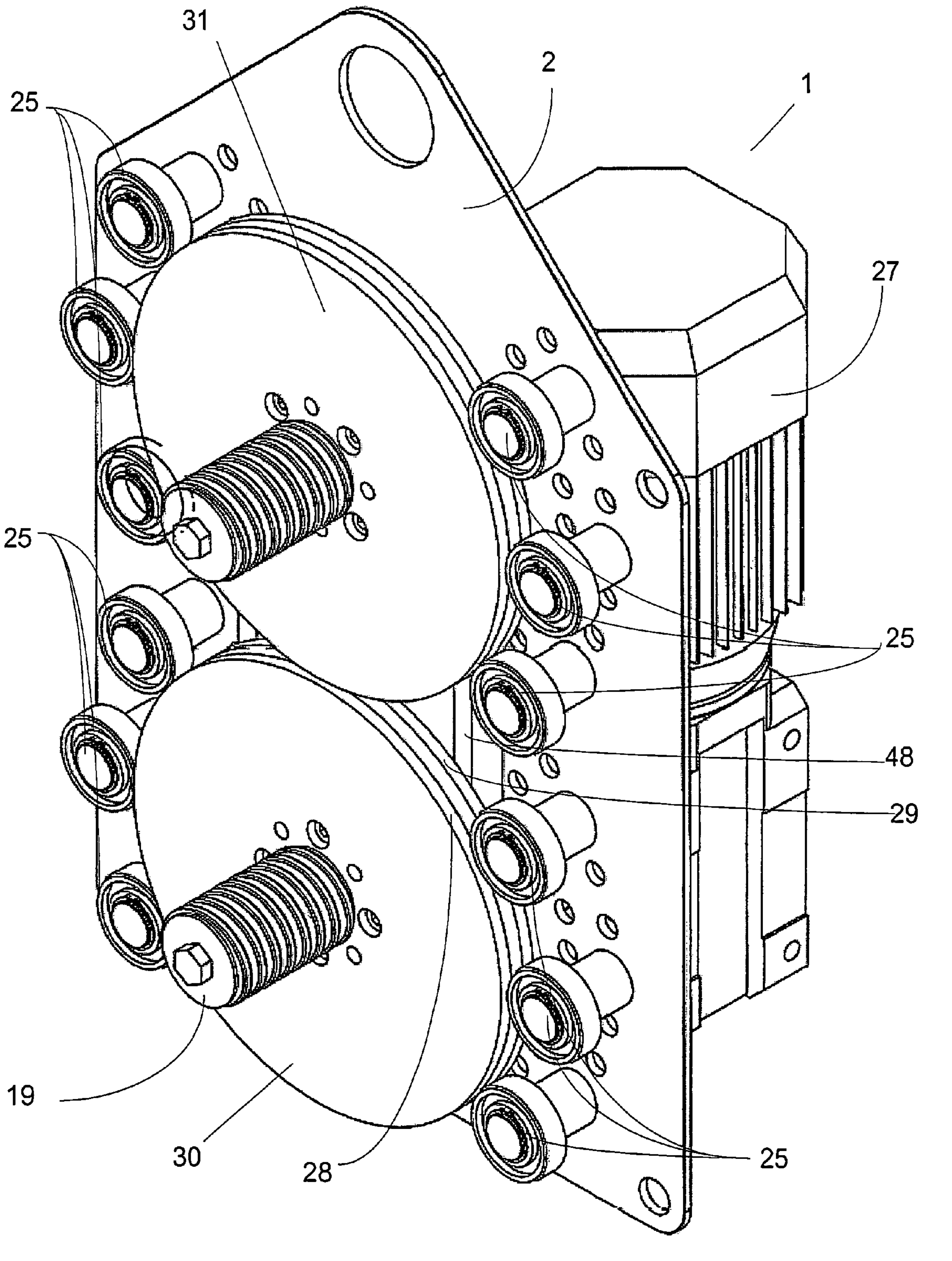
FIG. 2 is a diagrammatic representation of a rope feed apparatus according to the invention.
Figure 4:
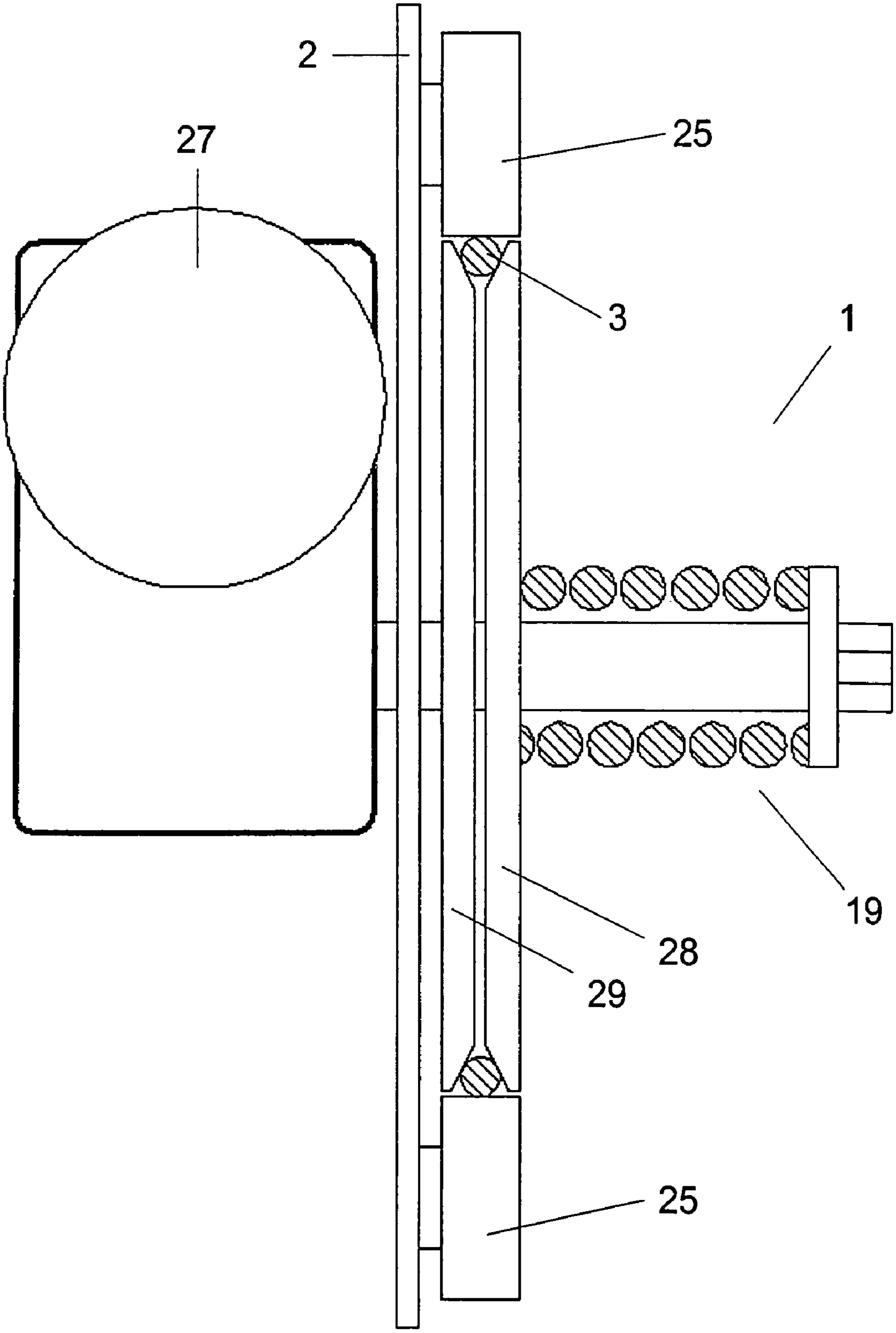
FIG. 4 is a diagrammatic representation of an embodiment of the rope feed apparatus of the invention.

FIG. 2 is a diagram representing the rope feed apparatus 1 of the invention. The rope feed apparatus of the invention is based on friction feed, which is accomplished by applying a controlled spring force against one or more two-part feed discs so that the discs 28, 29 are pressed towards each other. The discs 28, 29 are so designed that the rope tends to run on the rim of the feed disc. This is preferably implemented by beveling at least those of the circumferential edges of the discs which face towards each other, thus leaving between the discs 28, 29 a gap that widens towards the circumference, as visualized in FIG. 2. By the action of the force of the spring 19, the discs 28, 29 and the rope between them are brought to a balanced position such that the rope runs between the discs and is pressed against the guide rollers 25 especially by the radial force component produced by the bevel. This is visualized in FIG. 4, where the apparatus of the invention is illustrated suggestively and not in scale. In FIG. 4, the apparatus 1 is depicted as seen from the direction of rope motion.

As stated above, the apparatus comprises guide rollers 25 placed along the circumference of the discs to keep the rope between the discs 28, 29 during the pulling operation. By means of the guide rollers, the rope is deflected so that a controlled contact between the rope and the feed disc 30, 31 is achieved. The grip of the apparatus is based on a spring force, which can be produced in a controlled and repeatable manner after the rope has been mounted and which is implemented using a tightenable spring 19. The tightenable spring is preferably disposed as visualized in FIGS. 1 and 2 outside the disc pack formed by the discs 28, 29, coaxially on the axis of revolution of the discs to press the discs towards each other. Thus, the rope groove formed between the discs 28, 29 can adapt itself to variations in rope thickness, because the discs 28 and 29 are axially movable relative to each other against the spring force of the tightenable spring 19. The spring is preferably tightenable by a bolt as visualized in the figures. The tightening capacity of the bolt of the tightenable spring 19 is preferably so designed that the bolt is always screwed all the way in. This ensures that the grip force of the apparatus is independent of the installer, because variations due to tightening can be avoided.

The rope feed apparatus may comprise more than one feed disc. For example, it is possible to produce a version of the rope feed apparatus 1 by means of which all the ropes can be pulled simultaneously. When the apparatus has a plurality of feed discs 30, 31, these are preferably connected by a power transmission means 48, which is e.g. a chain, belt, cogged belt or pinion.

The guide rollers 25 are preferably disposed on two sides of the feed disc 30,31 at mutually opposite positions. Thus, the rope feed apparatus 1 can move the ropes on opposite sides of the feed disc simultaneously in opposite directions. Naturally, the device can also be so implemented that only one side is utilized, in which case no rollers are needed on the other side. In the figures, three guide rollers are shown on either side of the feed disc, but it is obvious that the device may have a different number of them, e.g. one or more, but preferably two rollers on either side.

According to a preferred embodiment, the rollers can be so implemented that they extend partially between the discs 28, 29. The rope can thus be caused to run deeper between the discs 28, 29, which will allow especially the rope splice to pass through more easily. This can be implemented by making the guide roller 25 narrow enough to allow it to go between the discs 28, 29. Alternatively, the guide roller becomes narrower towards the circumference or has on its outer surface a ridge narrower than the gap between the feed discs. A further possible implementation is to mount around the guide roller 25 a separate ferrule to form a narrow portion on the circumference of the discs.

Advantages and properties of the rope feed device:

Able to pull/feed rope simultaneously (on both sides)

Continuously controlled rope movement

No damage to rope

The same machine can be used for all rope diameters

- Able to pull the rope splice through the machine
- Able to grip the rope, even a closed loop
- No need to thread the rope through the device
- Allows the rope to be fastened e.g. to a rope rod while the rope is supported by a pulling machine
- Able to take hold of a straight, tightly tensioned rope
- Able to move itself by utilizing a rope in the elevator shaft
- Reliable hold of the rope and always the same holding power
- Holding power independent of installer, because the bolt of the spring comprised in the device is always tightened completely
- The pulling capacity of the device can be limited to keep it lower than its holding power or the bearing capacity of the rope splice
- No falling ropes
- Speed of the device can be adjusted steplessly
- Rope can be moved in both directions while the hold remains the same
- Motorized rope reel can be controlled synchronously together with the pulling device
- The old rope can also be coiled up without a motor, being pushed by the rope to be collected.

The rope reel according to the method can be arranged to be operated in synchronism with the rope pulling device. Thus, the rope reel may be motorized, in which case the reel is preferably started automatically when the pulling machine is operated, or it can be constructed to exert a continuous pull on the rope with a given force. In the method, the reel is used for automatic reeling up of the old rope.

Figure 3:
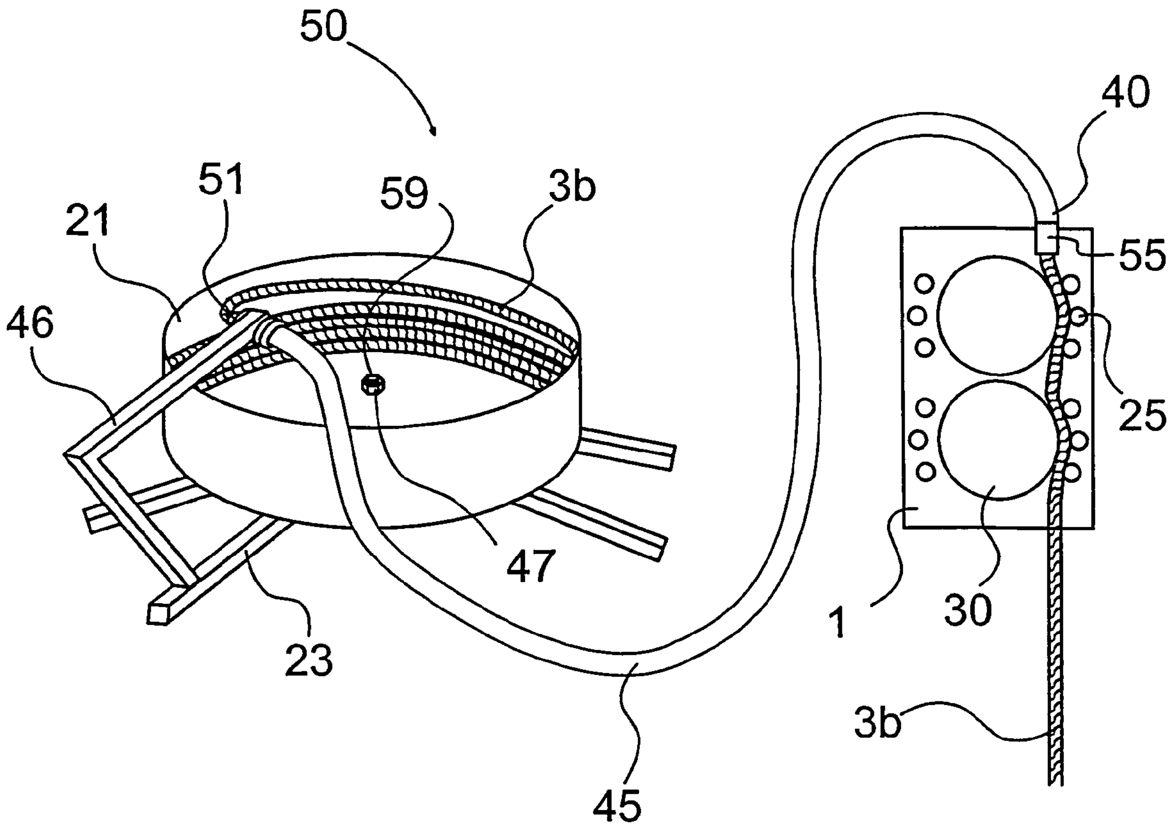
FIG. 3 is a diagrammatic representation of an embodiment of the rope feed apparatus of the invention.

FIG. 3 illustrates an embodiment of the rope feed apparatus of the invention, wherein the rope feed device 1 used also comprises an equipment 50 for collecting the old rope without a separate reeling motor by an arrangement where a collecting container (21) is adapted to be rotated by the pushing force of the rope (3*b*) being collected. The equipment 50 comprises a guide element 45, which in the embodiment described here is e.g. a plastic tube, fitted to be fastened by its first or free end 40 to the upper part of the feed device 1 by means of a fastening element 55. The fastening element 55 may be e.g. a sleeve through which the hoisting rope 3*b* is passed into the guide element 45 when the feed device 1 starts pulling the rope. The equipment 50 additionally comprises a collecting container 21, which can be placed on its supporting structure 23 e.g. on a landing floor or in some other suitable location. The collecting container 21 is a cylindrical container provided with a bottom and a vertically oriented barrel, substantially open at the top. To ensure that the old rope will remain firmly in the collecting container 21 during the replacement, it is possible to utilize the shape of the barrel of the collecting container or separate guide elements. The barrel may have e.g. the shape of an upwards tapering cone, or the upper edge of the barrel may be provided with an inward bend of trough-like or similar form.

The supporting structure 23 comprises four supporting legs made of e.g. metal and joined together under the center of the collecting container 21, and the collecting container 21 is fastened to the supporting structure 23 substantially by the center of its bottom by means of a rotational axle 59 and a fastening element 47 so that the collecting container 21 can rotate freely about its substantially vertical rotational axle 59. Either the collecting container 21 is rotatably mounted with bearings on the vertical axle 59 or the collecting container is fastened to the vertical axle 59 and the vertical axle 59 is rotatably mounted with bearings on the supporting structure 23. Attached by its first end to one of the legs of the supporting structure 23 is a supporting element 46, which is also made of e.g. metal. The free end of the supporting element 46 is fitted to extend suitably over the collecting container 21 and the second end 51 of the guide element 45 is attached to the free end of the supporting element 46 in an oblique position in both vertical and horizontal directions relative to the inner surface of the cylindrical part of the collecting container. Thus, the second end 51 of the guide element 45 is at an angle to the inner surface of the cylindrical part such that the rope coming through the guide element meets the inner surface of the barrel of the collecting container 21 substantially tangentially while being simultaneously directed downwards.

The operation of the equipment 50 is such that when the feed device 1 starts pulling out the old hoisting rope 3*b* while at the same time pulling the new hoisting rope 3*a* into position, the feed device 1 pushes the old hoisting rope 3*b* into the guide element 45 from the first end of the guide element. After the feed device 1 has pulled the new rope through some distance, the old hoisting rope 3*b* has moved inside the guide element 45 to the second end 51 of the guide element. When the end of the old hoisting rope 3*b* emerges from the second end 51 of the guide element 45, it is passed into the collecting container 21 at an oblique and sharp angle such that the rope end meets the inner surface of the cylindrical part of the collecting container 21 at an oblique angle, with the result that the collecting container 21 starts revolving about the rotational axle 59 due to the force transmitted by the rope, thereby coiling up the old hoisting rope 3*b* inside it as the rope is delivered from the guide element 45. The equipment 50 thus works in synchronism with the feed device 1 and requires no separate power source.

According to a preferred embodiment, the rope feed device 1 need not be directly attached to the guide element 45 as shown in FIG. 3 or placed in its vicinity. In such situations, the rope is passed through the guide element 45 into the collecting container 21 by gravity and the feed device 1 may be placed elsewhere in the elevator shaft than in the vicinity of the guide element 45 to feed the rope.

By the method of the invention, the rope is collected e.g. as follows: First, the rope 3*b* is passed into the guide element 45 through the first end 40 of the guide element. After this, the rope 3*b* is pushed forward inside the guide element 45 until the end of the rope 3*b* emerges from the second end 51 of the guide element. From here, the rope 3*b* is pushed into the collecting container 21 at a suitable downward oblique angle so that the rope meets the inner surface of the collecting container 21 and the collecting container 21 is caused to revolve about its rotational axle 59 by the thrust of the rope 3*b*. This action of pushing the rope 3*b* into the collecting container 21 is continued for a desired period of time, the rope 3*b* being thus neatly coiled up inside the collecting container 21.

The collecting container 21 can also be provided with a plastic bag or a corresponding bag, in which case the old hoisting rope is adapted to be coiled up directly in the bag in the collecting container 21. This allows the old rope to be neatly collected, and once the whole rope is in the bag, the bag with the rope is removed and a new bag is placed in the collecting container for the next rope. In the bag, the rope can be easily conveyed to a further treatment stage.

Instead of having a tubular form, the guide element may have some other form. Thus, the guide element may preferably have e.g. a trough-like shape such that the rope will be guided into the collecting container along the bottom and side edges of the trough of the guide element.

It is obvious to a person skilled in the art that the feed device can be disposed in a different place than where it is placed in the above description. The feed device can thus be secured to any supporting structure suited for the situation. It is obvious that the collecting container may also be a basket or equivalent. The collecting container may be a temporary container constructed in a frame, e.g. a container with a separate bottom and a side wall element bendable inside the frame.

According to a preferred embodiment, rope replacement can in practice be implemented in such manner that the rope feed device 1 in FIG. 3 feeds new rope into the elevator system while at the same time feeding out old rope, so that on one side of the feed discs the rope is moved upwards and on the other side downwards. FIG. 3 illustrates a situation where the old rope 3*b* is being fed upwards into the guide element 45. In the figure, it would be possible to simultaneously feed a new rope downwards by the left-hand edge of the feed disc 30, the new rope being attached to the old rope so that it is passed through the route whereby the old rope is removed.

It is obvious to a person skilled in the art that different embodiments of the invention are not exclusively limited to the examples described above, but that they may be varied within the scope of the claims presented below. It is obvious to a person skilled in the art that that the suspension ratio of the elevator does not limit the range of application of the invention, but that it can be used in an elevator implemented with any suspension ratio.

It is also obvious to a person skilled in the art that the method and apparatus of the invention can be implemented in other ways than in the examples described above. The rope feed device of the invention can be used in all situations where there is a need to pull or feed a rope in a controlled manner from/into an elevator shaft or to perform both actions simultaneously.

The invention claimed is:

1. A roping method for replacing, installing and/or re-roping a hoisting rope of a traction sheave elevator, comprising:

securing an elevator car in position;

fitting a rope feed apparatus to act on an old hoisting rope;

releasing both ends of the old hoisting rope from anchorages;

joining a new rope to one end of the old rope with a slice;

feeding the new rope to the elevator and pulling out the old hoisting rope by means of the rope feed device;

fastening ends of the new hoisting rope to final anchorages;

wherein the old hoisting rope is arranged to be collected in a collecting container and the old hoisting rope is pushed into the collecting container so that the collecting container is caused to rotate about a rotational axle by the thrust of the old hoisting rope.

2. The roping method according to claim 1, wherein, before being pushed into the collecting container, the old hoisting rope to be collected is conveyed into a tubular guide element, which is adapted to guide the old hoisting rope at a substantially downward oblique angle into the collecting container.

3. The roping method according to claim 1, wherein the old hoisting rope is pushed into the collecting container through the guide element by the rope feed device or by gravity while the new hoisting rope is being pulled into position by means of the old hoisting rope.

4. A rope feed apparatus for replacing, installing and/or re-roping the hoisting rope of an elevator, rope feed apparatus comprising:

a base;

at least one feed disc mounted on the base, said feed disc engaging a hoisting rope;

at least one guide roller for keeping the hoisting rope in position on the feed disc;

a tightening element for moving the feed disc in an axial direction relative to the base; and at least one electric motor fitted in the apparatus to rotate the feed disc, wherein the tightening element is coaxial with the at least one feeding disc.

5. The rope feed apparatus according to claim 4, wherein the feed disc of the rope feed apparatus comprises at least two discs, between which the hoisting ropes can be pressed to produce friction between the hoisting rope and the at least two discs, at least one of said discs being movable relative to an other of the discs to accommodate different sized ropes.

6. The rope feed apparatus according to claim 4, wherein the apparatus has at least two feed discs and the apparatus has at least two guide rollers.

7. The rope feed apparatus according to claim 4, wherein the tightenable element is a spring.

8. The rope feed apparatus according to claim 4, further comprising:

a rope reel provided with a motor.

9. A rope feed apparatus for replacing, installing and/or re-roping the hoisting rope of an elevator, rope feed apparatus comprising:

a base;

at least one feed disc mounted on the base, said feed disc engaging a hoisting rope;

at least one guide roller for keeping the hoisting rope in position on the feed disc;

a tightening element for moving the feed disc relative to the guide roller; and at least one electric motor fitted in the apparatus to rotate the feed disc;

a collecting container the hoisting rope to be collected being adapted to be placed in said collecting container, wherein the collecting container is provided with a rotational axle and the collecting container is adapted to be rotated about the rotational axle by the pushing force of the hoisting rope.

* * * * *